April 21, 1931. G. P. HURST 1,801,505
NUT LOCK
Filed July 3, 1929
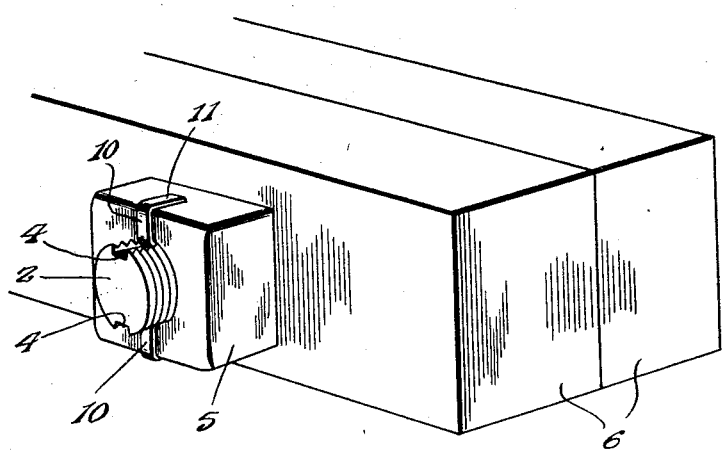
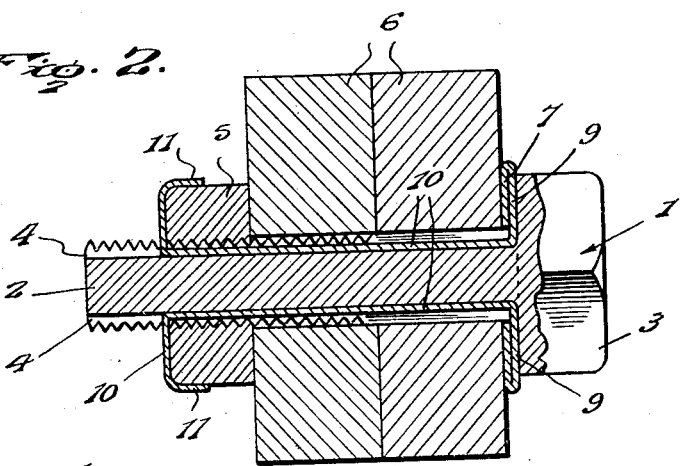
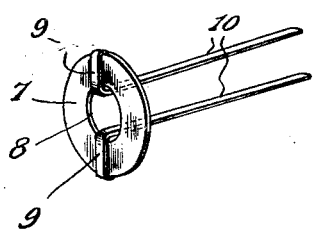
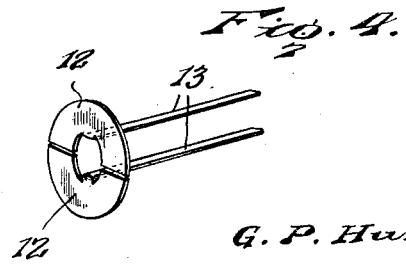
Inventor
G. P. Hurst.
By Lacey & Lacey, Attorneys Patented Apr. 21, 1931

1,801,505

UNITED STATES PATENT OFFICE

GEORGE P. HURST, OF RAPID CITY, SOUTH DAKOTA, ASSIGNOR OF ONE-HALF TO GEORGE B. SNYDER, OF RAPID CITY, SOUTH DAKOTA

NUT LOCK

Application filed July 3, 1929. Serial No. 375,708.

This invention relates to nut and bolt locks, and one object of the invention is to provide a device of this character which is simple in construction and may be very easily applied and securely retain the nut tightened but at the same time allow it to be released if necessary.

Another object of the invention is to so form this lock that not only will the nut be prevented from loosening but also the bolt held against turning when the lock is fastened.

The invention is illustrated in the accompanying drawing, wherein

Figure 1 is a perspective view showing a nut secured by the improved lock,

Fig. 2 is a sectional view taken longitudinally through the bolt,

Fig. 3 is a perspective view of the locking device, and

Fig. 4 is a perspective view of a modified form of the invention.

The bolt, which is indicated in general by the numeral 1, consists of the usual shank 2 which is threaded and has a head 3 at one end. Grooves 4 are formed longitudinally in the shank of the bolt in opposed relation to each other and are of greater depth than the threads so that securing arms of a fastener may extend through these grooves without interfering with application or removal of the nut 5 which is to be screwed upon the bolt and tightened until articles, such as the bars 6, through which the bolt passes will be firmly gripped between the nut and the head of the bolt.

The fastener or lock by means of which the nut is to be secured may be formed either as shown in Fig. 3 or as shown in Fig. 4. In the form shown in Fig. 3, the lock consists of a circular disk 7 formed with a center opening 8 of the proper diameter to receive the shank of the bolt and from opposite portions of this disk extend strips which are bent inwardly towards the opening 8, as shown at 9, and through this opening so that they project from the inner circumference of the disk or washer at opposite sides of the center opening to form arms 10. These arms are of the proper width and thickness to be received in the grooves 4 of the shank 2 without extending into the path of the threads and, therefore, the nut may be applied in the usual manner and screwed tightly into place. The arms are of greater length than the shank of the bolt and, therefore, when first applied, they project from the free end of the shank so that after the nut has been fully tightened the projecting ends of the arms may be easily grasped and these arms bent across the outer face of the nut and into flat contacting engagement with opposed side faces of the nut, as shown at 11. By this arrangement the nut may be securely held against loosening and since the arms extend through the grooves in the shank of the bolt the bolt will be prevented from turning in the nut. Therefore, the nut and bolt will be firmly locked in a set position. When it is desired to remove the nut, it is merely necessary to rebend the ends of the arms and the nut can be easily unscrewed.

The locking device shown in Fig. 4 is slightly different from the form shown in Fig. 3. In this form of the invention, the disk consists of separate segments 12 which preferably form a complete circle, although they may be less than a circle and terminate in spaced relation to each other so that they may be applied to bolts of different diameters. Arms 13 are carried by the segments 12 but instead of extending from their outer edges they are joined to the segments at their inner edges and, therefore, do not extend across the segments when they are bent to project longitudinally of the bolt. When this form of locking device is in use, the segments are applied against the inner face of the bolt head with the arms 13 extending longitudinally of the shank and fitting into the grooves. The nut is applied and tightened as previously set forth and after the nut has been sufficiently tightened the free ends of the arms are bent to extend across the outer end face of the nut and bear against opposed side faces thereof. It will thus be seen that the operation is similar to that previously described.

I have, therefore, provided a nut lock which may be easily applied to a bolt and by means of which a nut may be firmly secured in a set position but allowed to be released when necessary. It will be further noted that the nut lock is simple in its construction and cheap to produce.

Having thus described the invention, I claim:

In a nut lock, a bolt having a threaded shank formed with longitudinally extending grooves, a head at one end of said shank, a nut screwed upon said shank, and means to secure said nut in a set position upon said shank consisting of a disk adapted to fit against the inner face of said head and formed with an opening to receive said shank, strips extending from the outer margin of said disk and bent inwardly across the disk and through the opening thereof to provide arms extending through the grooves of said shank, the arms being of greater length than the shank and adapted to have their end portions bent across the outer face of the nut and against side faces thereof to secure the nut in a set position.

In testimony whereof I affix my signature.

GEORGE P. HURST. [L. S.]